(12) United States Patent
Pribish

(10) Patent No.: US 6,524,096 B2
(45) Date of Patent: Feb. 25, 2003

(54) BURNER FOR HIGH-TEMPERATURE COMBUSTION

(76) Inventor: Vincent R. Pribish, 26 Boom Rd., Saco, ME (US) 04072

( * ) Notice: Subject to any disclaimer, the term of this patent is extended or adjusted under 35 U.S.C. 154(b) by 98 days.

(21) Appl. No.: 09/755,350

(22) Filed: Jan. 5, 2001

(65) Prior Publication Data

US 2002/0090587 A1 Jul. 11, 2002

(51) Int. Cl.⁷ .............................................. F23D 14/20
(52) U.S. Cl. .......................... 431/8; 431/187; 431/215; 431/353; 239/132.5; 239/424
(58) Field of Search .................. 431/4, 8, 181, 431/187, 215, 353; 239/129, 132.5, 423, 428, 434.5, 549, 422, 424, 424.5, 132.3; 110/262, 306

(56) References Cited

U.S. PATENT DOCUMENTS

| | | | |
|---|---|---|---|
| 4,385,661 A | | 5/1983 | Fox |
| 4,416,613 A | * | 11/1983 | Barisoff ..................... 431/353 |
| 4,797,087 A | * | 1/1989 | Gitman ....................... 431/187 |
| 5,002,483 A | | 3/1991 | Becker |
| 5,178,921 A | * | 1/1993 | Whelan .................... 110/182.5 |
| 5,411,395 A | * | 5/1995 | Kobayashi et al. ......... 431/187 |
| 5,823,762 A | * | 10/1998 | Anderson et al. ........ 239/424.5 |
| 5,891,404 A | * | 4/1999 | Ibaraki et al. .............. 431/353 |

FOREIGN PATENT DOCUMENTS

| | | |
|---|---|---|
| EP | 0 529 667 A2 | 3/1993 |
| GB | 2 077 902 A | 12/1981 |

* cited by examiner

Primary Examiner—Sara Clarke
(74) Attorney, Agent, or Firm—Charles F. Seyboldt

(57) ABSTRACT

A high-temperature burner is provided that is suited for the incineration of shredded plastics, tires, carpet or similar materials. The burner walls are protected from the heat of the ongoing combustion reaction by an annular curtain of water vapor or carbon dioxide that takes the radiant heat energy of the high-temperature combustion reaction. The annular curtain removes the heat energy from the vicinity of the burner walls before the energy can be conveyed to them. Higher temperature combustion can be attained without resorting to jacketed burner construction or the use of refractory materials.

10 Claims, 5 Drawing Sheets

BURNER FOR HIGH-TEMPERATURE COMBUSTION

BACKGROUND OF THE PRESENT INVENTION

SUMMARY OF THE PRIOR ART

This invention relates to a burner, and more particularly to a burner for high temperature combustion wherein the interior burner wall is protected from the heat of combustion by a primarily gaseous shield, and wherein the gaseous shield is substantially made up of water vapor or carbon dioxide or a combination of water vapor and carbon dioxide.

High temperature combustion reactions are useful, because they encourage the conversion of carbon monoxide to carbon dioxide, the combustion of relatively large organic molecules, and the combustion of "soot." The high temperature combustion reaction results in less production of pollutants than a lower temperature combustion, given the same source of fuel.

The use of burners to produce or contain high temperature combustion reactions is well known, and a variety of methods have been adopted to permit high combustion temperatures. As the temperature of the combustion reaction is increased, such as occurs when the oxidizing agent is enhanced air (air having more than the naturally occurring fraction of oxygen) or near pure oxygen, it becomes necessary to either fabricate the burner from heat resistant materials such as refractory, (or so-called refractory metals) or to provide for a means to cool the burner walls, i.e. remove the heat energy that is delivered to the burner walls by the combustion reaction.

Refractory materials, whether ceramic or metallic, tend to be more costly from both raw material and fabrication aspects, than commonly fabricated materials such as low alloy steels.

While a cooling jacket provides means for cooling the walls of a burner, the construction of a cooling jacket adds a fabrication cost that may be desirable, but is not necessary to the practice of the present invention.

U.S. Pat. No. 4,416,613 to Barisoff discloses a blowpipe (tubular) burner where the flame is contained in the tubular burner, and the burner incorporates a jacket carrying air as a cooling medium. Ambient air passes through the jacket in a counterflow direction, and all of the cooling air is discharged through the combustion process. Some of the cooling air is used in the combustion process, and the balance of the cooling air is "expelled through annular end (27) as an annular gaseous shield (32) between the outer wall of the inner tubular shield (25) and the central flame (33)." Barisoff at Column 3, Line 23.

The annular gaseous shield of the present invention differs from the one taught by U.S. Pat. No. 4,416,613 to Barisoff in important aspects. For example, the invention of Barisoff uses only air as a cooling medium, while the present invention uses a gas that is primarily made up of water vapor or carbon dioxide, as opposed to the incidental amounts of water vapor and carbon dioxide present in ambient air.

U.S. Pat. No. 5,372,857 to Browning discloses a tubular burner where the combustion process proceeds within an internal tube, and where a jacket is provided and the cooling medium in the jacket is described as being steam. The inventor notes that cooling is achieved by the evaporation of water passing over (outside) of the tube that contains the combustion reaction (Column 1, line 39 and Column 3, lines 8–11 and lines 21–23).

U.S. Pat. No. 4,931,013 to Brahmbatt, et al, discloses a burner that has concentric passages for the passage of air, fuel and oxygen. These passages are intended to facilitate the mixing of these three constituents at the end or face of the burner, where a combustion reaction is taking place. The concentric structure is disclosed, and the body of the disclosure describes the cooling effect of passing combustion air through the burner so as to obviate the need for additional burner cooling. This apparatus does not contain the flame or combustion process, rather the cooling is desirable to protect the burner tip itself.

U.S. Pat. No. 5,217,363 to Brais, et al discloses a burner that has concentric passages for the passage of air, fuel and oxygen. It appears to have the same general objectives as the '013 patent, and has a jacket that is arranged to cool the outside wall of the burner with a flow of air.

U.S. Pat. No. 5,454,712 to Yap discloses a burner where the burner is protected from the highest heat of the flame by the presence of a swirling flow of air that joins the combustion at a distance from the burner.

U.S. Pat. No. 4,642,047 to Gitman discloses a burner having a liquid-filled cooling jacket.

U.S. Pat. No. 4,666,397 to Wenning, et al discloses a burner that has a hollow nozzle that can be cooled by flowing a medium within the hollow nozzle section, outside of the volume occupied by the combustion reaction.

U.S. Pat. No. 4,887,800 to Hotta, et al discloses a nozzle for burning coal, where the nozzle is cooled by a water jacket.

SUMMARY OF THE PRESENT INVENTION

The present invention contemplates a tubular burner unit (typically a hollow cylindrical shape) having means to introduce a fuel and an oxidizer to a central area at one end of the burner, and may be provided with a means of igniting the fuel. A burner unit according to the present invention will also have openings at or near the combustion initiation end of the burner for the introduction of a gaseous medium that will flow in a curtain-like fashion close to the interior wall of the burner. The gaseous medium provided is made up of a substance that has a relatively high heat capacity (i.e. requiring a relatively high amount of energy to raise the temperature of a unit of mass), such as water or carbon dioxide, as opposed to using an air-like mixture for the transfer of some of the heat energy.

The temperature of combustion tends to increase as the oxidizer becomes more concentrated, i.e. as the percentage of oxygen in the oxidizer increases, so does the temperature of combustion. When nearly pure oxygen is used, a very high temperature is produced, in some cases as high as about 5,000 degrees Fahrenheit. The use of high oxygen concentrations is desirable to minimize the production of oxides of nitrogen, but results in a flame that is very bright and radiant.

The present invention relies on an annular stream or curtain, made up primarily of water vapor or carbon dioxide or a mixture of water vapor and carbon dioxide, disposed between the combustion reaction and the inside wall of the burner. The annular stream of cooling medium functions to intercept and absorb some of the heat of combustion before it can be transmitted to the wall of the burner by the radiated, conducted and convection heat energy of the combustion reaction. Water vapor and carbon dioxide are desirable for this function because these compounds are relatively efficient and ready absorbers of the energy radiated by the incandescent light of the high temperature combustion reaction.

It is possible to control or modulate the temperature of the burner wall by varying the mass flow rate and composition of the cooling medium, e.g by changing the ratio of water vapor to carbon dioxide, or by introducing other constituents to the cooling medium stream, or by regulating the incoming temperature of the gaseous cooling medium, or by a combination of these factors.

Because it is possible to maintain the temperature of the burner tube with the annular stream of cooling medium, it becomes unnecessary to provide for cooling of the burner tube from its outside. A burner according to the present invention can have a burner tube that is efficiently insulated (such as with a vacuum jacket or other heat insulating medium), and force the heat of combustion to be carried by the gaseous cooling medium.

It is an object of the present invention to reduce the amount of energy transmitted to the walls of a burner, so that a given burner may be operated at a higher combustion temperature than it could be, without the gaseous curtain.

It is an object of the present invention to provide a low cost apparatus for performing high temperature incineration.

It is a further object of the present invention to enable the combustion of fuels using nearly pure oxygen, in order to minimize the production of oxides of nitrogen.

The present invention relates to a burner for high-temperature combustion that may be adapted and adjusted to optimize the combustion reaction. Specific features of the invention will be apparent from the above and from the following description of the illustrative embodiments when considered with the attached drawings and the appended claims.

In summary, and in accordance with the above discussion, the foregoing objectives are achieved in the following embodiments.

1. A high-temperature burner comprising:
   a hollow burner tube having a combustion end, an open discharge end, and an interior wall;
   a burner cap located at the combustion end of the hollow burner tube;
   a fuel delivery means in the burner cap, having an opening for the discharge of fuel to the interior of the hollow burner tube, where the opening for discharging fuel is located near the longitudinal axis of the hollow burner tube;
   an oxidizer delivery means in the burner cap, having an opening for the discharge of oxidizer to the interior of the hollow burner tube, where the opening for discharging the oxidizer is located between the longitudinal axis of the hollow burner tube and the interior wall of the hollow burner tube; and
   cooling medium delivery means in the burner cap, having an opening for the discharge of a cooling medium to the interior of the hollow burner tube, where the opening for discharging the cooling medium is located between the opening for discharging the oxidizer and the interior wall of the hollow burner tube.

2. A high temperature burner as described in Paragraph 1 where the hollow burner tube is made of a ceramic material.

3. A high temperature burner as described in Paragraph 1 where the hollow burner tube is made of silicon carbide material.

4. A high temperature burner as described in Paragraph 1 where the opening for discharging the oxidizer is a series of annular-spaced holes and the opening for discharging the cooling medium is a series of annular-spaced holes.

5. A high temperature burner as described in Paragraph 1 where the opening for discharging the oxidizer is an annular shaped hole, and the opening for discharging the cooling medium is an annular shaped hole.

6. A method of burning materials comprising:
   (a) providing a burner having
      a hollow burner tube having a combustion end, an open discharge end, and an interior wall;
      a burner cap located at the combustion end of the hollow burner tube;
      a fuel delivery means in the burner cap, having an opening for the discharge of fuel to the interior of the hollow burner tube, where the opening for discharging fuel is located near the longitudinal axis of the hollow burner tube;
      an oxidizer delivery means in the burner cap, having an opening for the discharge of oxidizer to the interior of the hollow burner tube, where the opening for discharging the oxidizer is located between the longitudinal axis of the hollow burner tube and the interior wall of the hollow burner tube; and
      cooling medium delivery means in the burner cap, having an opening for the discharge of a cooling medium to the interior of the hollow burner tube, where the opening for discharging the cooling medium is located between the opening for discharging the oxidizer and the interior wall of the hollow burner tube;
   (b) providing a fuel to the fuel delivery means and an oxidizer to the oxidizer deliver means;
   (c) initiating a combustion reaction between the fuel and the oxidizer to produce hot exhaust products; and
   (d) providing a gaseous cooling medium to the cooling medium delivery means and inducing a flow of gaseous cooling medium between the combustion reaction and the interior wall of the hollow burner tube.

7. A method of burning materials as described in Paragraph 6, where the gaseous cooling medium is primarily water.

8. A method of burning materials as described in Paragraph 6, where the gaseous cooling medium is primarily a mixture of water and carbon dioxide.

9. A method of burning materials as described in Paragraph 7 further comprising:
   (e) directing the hot exhaust products to a heat exchanger; and
   (f) transferring some of the heat of the hot exhaust products to the cooling medium.

10. A method of burning materials as described in Paragraph 6, where the oxidizer is enriched air having at least 28 percent oxygen gas.

11. A method of burning materials as described in Paragraph 10, where the gaseous cooling medium is primarily water.

12. A method of burning materials as described in Paragraph 10, where the gaseous cooling medium is primarily a mixture of water and carbon dioxide.

13. A method of burning materials as described in Paragraph 11, further comprising:
   (e) directing the hot exhaust products to a heat exchanger; and
   (f) transferring some of the heat of the hot exhaust products to the cooling medium.

14. A method of burning materials as described in Paragraph 12, where the gaseous cooling medium is partially made of the hot exhaust products of the combustion reaction.

15. A method of burning materials as described in Paragraph 14, further comprising:
   (e) directing the hot exhaust products to a heat exchanger; and (f) transferring some of the heat of the hot exhaust products to the cooling medium via the heat exchanger.

DESCRIPTION OF THE PREFERRED EMBODIMENTS OF THE PRESENT INVENTION

In one embodiment, the burner of the present invention comprises a hollow cylindrical burner tube and a cap for the discharge of fuel, oxidizer and the gaseous cooling medium to the interior of the hollow burner tube.

It is not necessary that the burner tube be cylindrical, and various shapes may prove advantageous, depending on the materials and fabrication methods appropriate for those materials, as well as to suit various combustion reactions.

Figure 1:
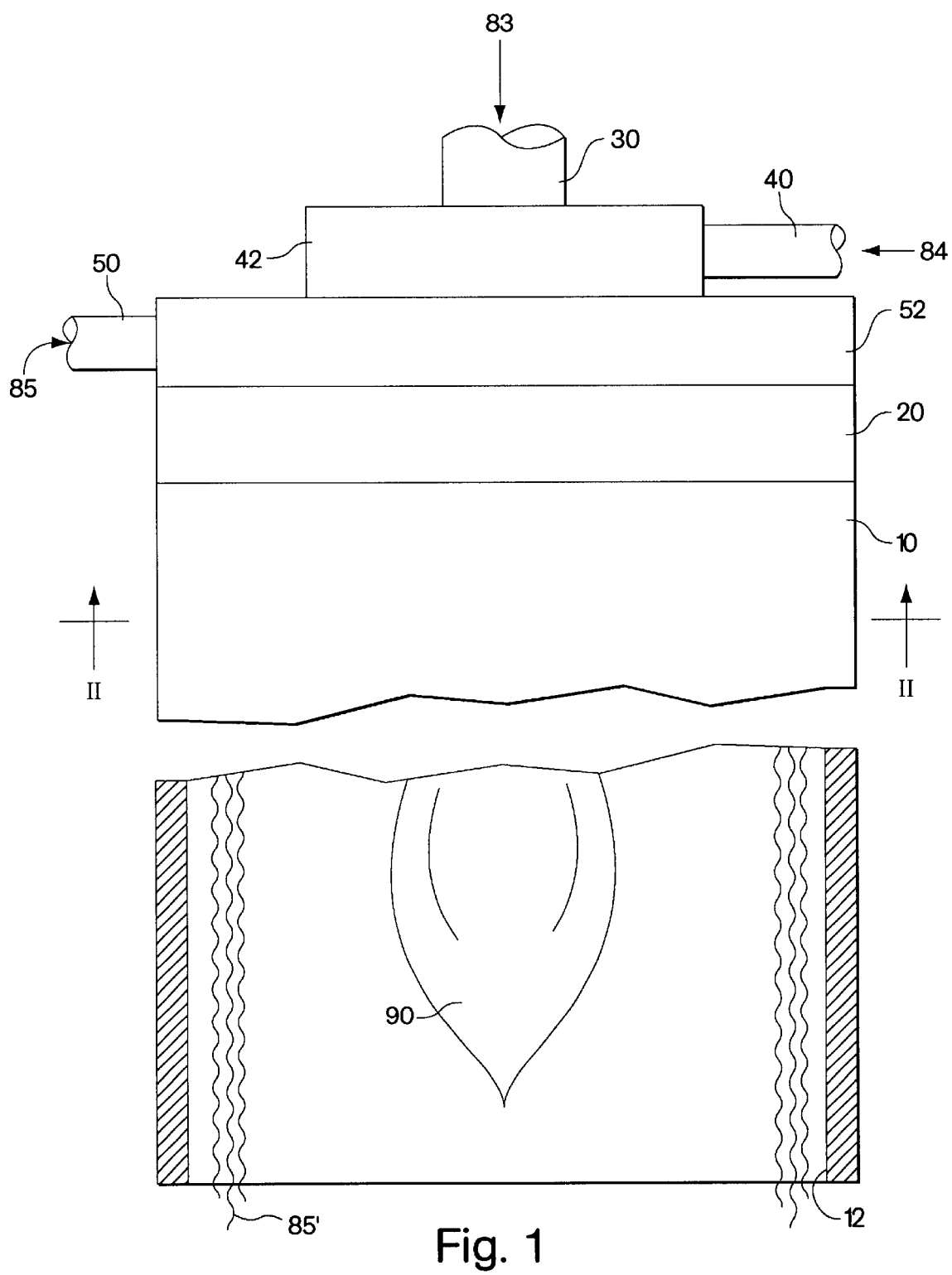
FIG. 1 is a partially cutaway elevation view of a burner unit of one embodiment of the present invention.

FIG. 1 is a partially cutaway elevation view of a burner unit of one embodiment according to the present invention.

The burner is made up of hollow cylindrical burner tube 10 that will contain the combustion reaction and burner cap 20 that has openings for the introduction of fuel, oxidizer and cooling medium to the inside of the burner tube. Burner cap 20 comprises means 30 for delivering fuel 83, means 40, 42 for the delivery of an oxidizer 84, and means 50, 52 for the delivery of the cooling medium 85.

The combustion reaction between the fuel 83 and the oxidizer 84 is represented as flame 90 in FIG. 1. Some of the heat from the combustion reaction is radiated toward the inside wall 12 of the burner tube 10. The cooling medium 85 forms an annular gaseous shield 85' that is disposed between the combustion reaction 90 and the interior wall 12 of the burner tube 10.

The simple shape of burner tube 10 permits it to be cost-effectively constructed of refractory materials, such as Silicon Carbide. The performance of the burner according to the present invention is enhanced by making the inside walls 12 smooth or reflective. Highly reflective interior walls 12 will redirect energy of combustion to the annular gaseous shield 85', and further reduce the transfer of heat energy to burner tube 10.

In the preferred embodiment, the burner tube is about 1,200 millimeters in length, about 450 millimeters in outside diameter, and has a wall thickness of about 10 millimeters.

Figure 2:
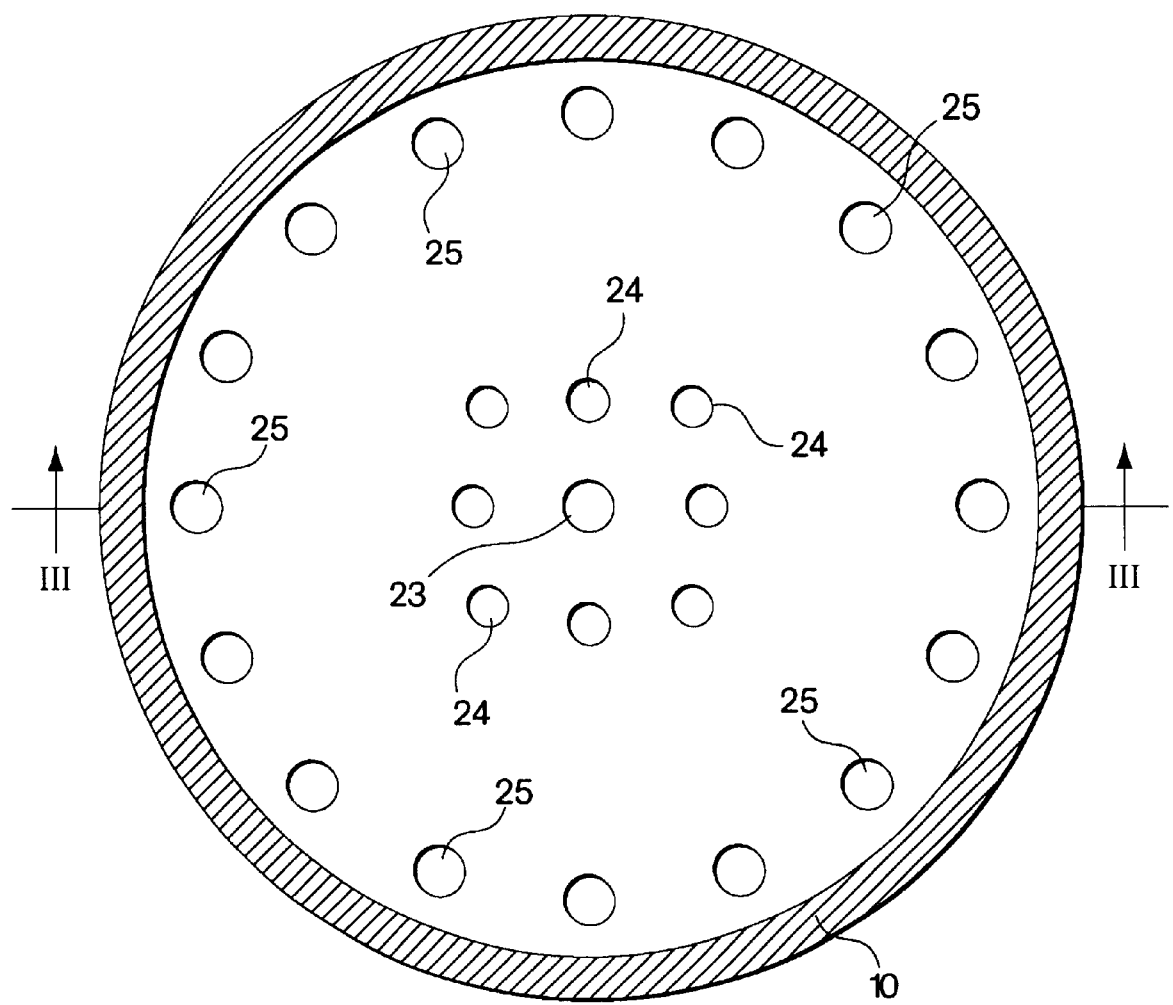
FIG. 2 is a sectional view taken in the direction of line "II—II" of FIG. 1 and shows an end view of one embodiment of a burner cap according to the present invention.

FIG. 2 is a sectional view taken in the direction of line "II—II" of FIG. 1 and shows an end view of one embodiment of a burner cap according to the present invention.

Figure 3:
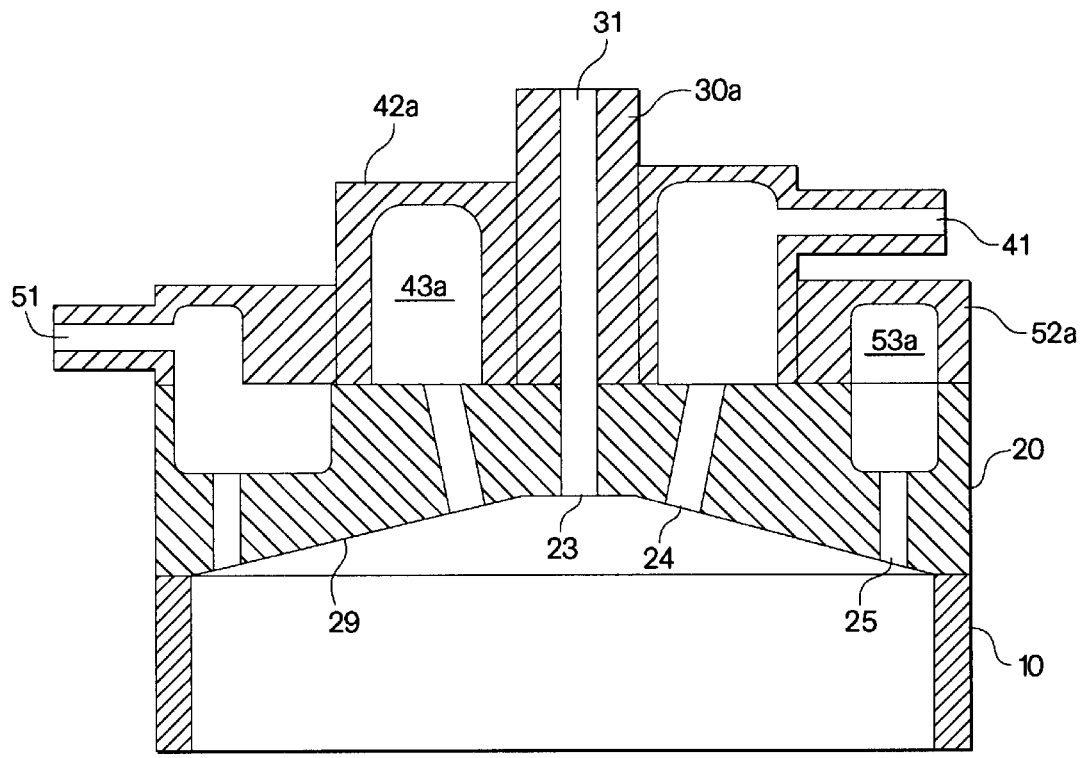
FIG. 3 is a sectional view taken in the direction of line "III—III" of FIG. 2.

FIG. 3 is a sectional view taken in the direction of line "III—III" of FIG. 2.

In the burner cap configuration illustrated by FIGS. 2 and 3, the oxidizer and cooling medium are discharged into the combustion area via a series of holes spaced in an annular pattern.

In the burner cap construction illustrated in FIGS. 2 and 3, Fuel 83 is introduced to burner cap 20 via hole 31 and fuel delivery means 30 (30a). The fuel will exit the burner cap through centrally located fuel discharge hole 23. The size and shape of the fuel discharge is varied to suit the fuel being consumed. For example, fuel discharge opening 23 may be shaped to create high fuel velocity or atomization, may be positioned away from face 29 of burner cap 20, or may be made up of multiple openings.

Oxidizer 84 is introduced to burner cap 20 via hole 41 and oxidizer delivery means 40, 42 (42a). The oxidizer enters oxidizer plenum 43a, and exits the burner cap through multiple oxidizer discharge holes 24. The size, shape and directional arrangement of the fuel and oxidizer discharge holes may be varied to suit various fuel and oxidizer combinations. For example, the oxidizer deliver holes could be angled so as to introduce a swirling motion to the combustion reaction, could be directed so as to form a conical shape (i.e. each oxidizer stream meeting at a common apex located some distance from burner cap face 29), could be directed so as to form a cylindrical pattern (i.e. each oxidizer stream being directed parallel to the axis of the burner tube 10), or could be directed in a diverging pattern.

Cooling medium 85 is introduced to burner cap 20 via hole 51 and cooling medium delivery means 50, 52 (52a). The cooling medium enters plenum 53a and exits the burner cap through cooling medium discharge holes 25. As with the oxidizer holes, the cooling medium holes can be arranged in a fashion to produce an optimum gaseous shield, which can vary depending on the specific fuel and oxidizer that feed the combustion reaction. The concave shape of combustion initiation end 29 of burner cap 20 serves to reduce the entrapment of the gaseous cooling medium due to the turbulence of combustion.

Cooling medium plenum 53a may be arranged so as to cool burner cap 20, before the cooling medium is discharged via holes 25. That is, plenum 53a may be contained partially within cooling medium delivery means 52a, and partially within burner cap 20, or even entirely within burner cap 20. Plenum 53a may also include a serpentine path, or other geometry, in order to take heat from any hot spots in the burner cap.

Figure 4:
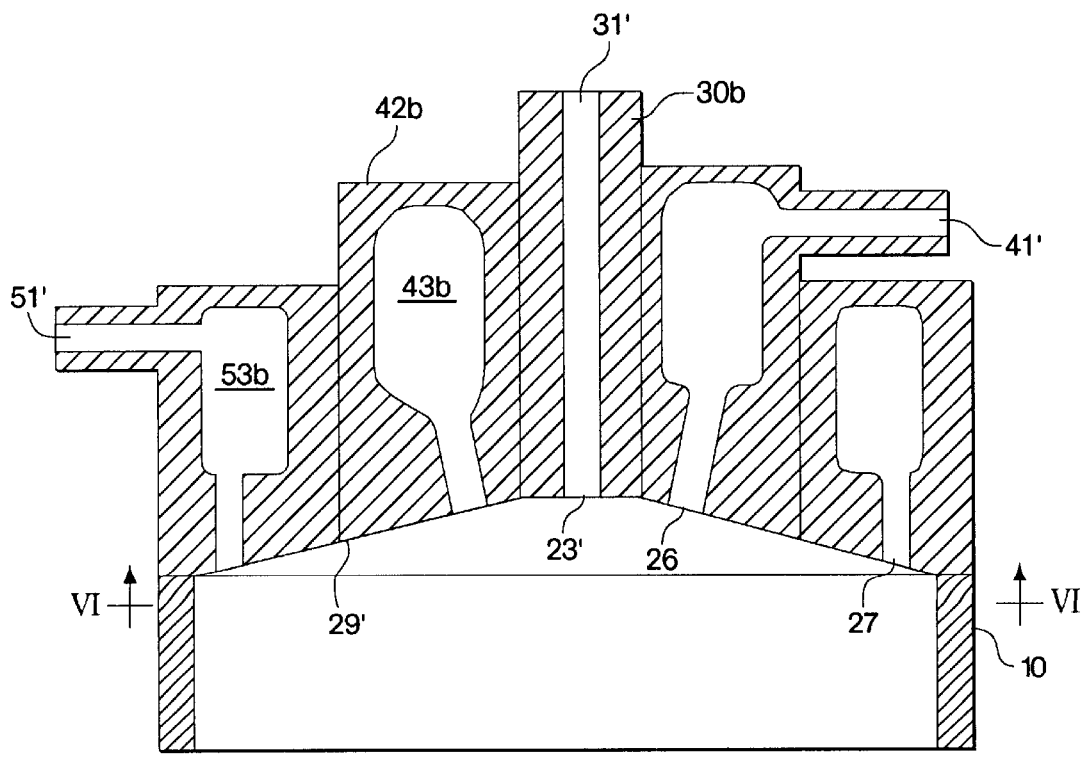
FIG. 4 is a sectional view of an alternative design of a burner cap.

FIG. 4 is a sectional view of an alternative design of a burner "cap."

Figure 6:
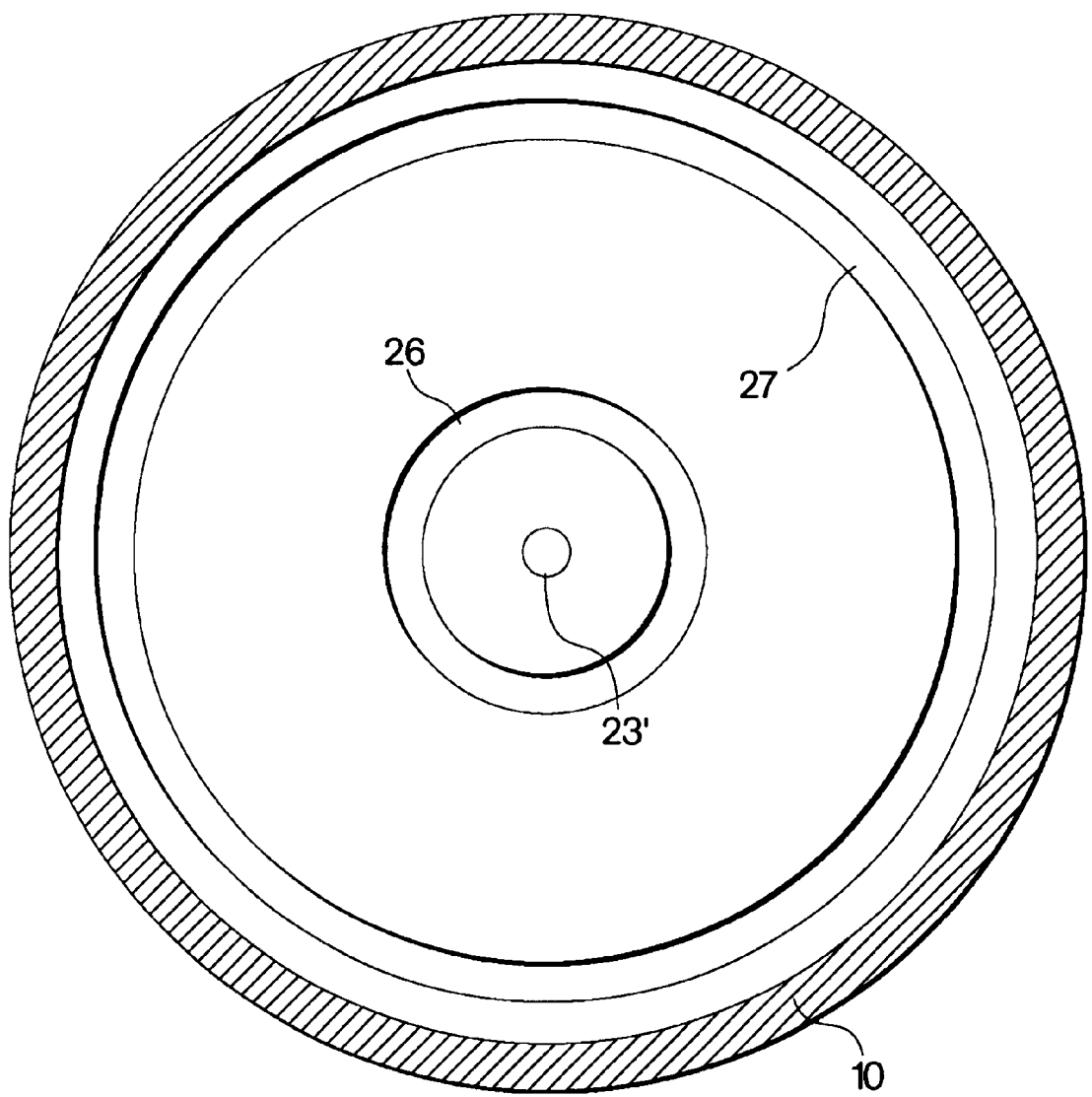
FIG. 6 is a sectional view taken in the direction of line "VI—VI" of FIG. 4.

In the burner cap configuration illustrated by FIGS. 4 and 6, the oxidizer and cooling medium are discharged into the combustion area via annular openings.

FIG. 6 is a sectional view taken in the direction of line "VI—VI" of FIG. 4.

In the burner cap construction illustrated in FIG. 4, Fuel 83 is introduced to the combustion reaction 90 via hole 31' and fuel delivery means 30b. The fuel will exit the burner cap through centrally located fuel discharge hole 23'.

Oxidizer 84 is introduced to the combustion reaction via hole 41' and oxidizer delivery means 42b. The oxidizer enters oxidizer plenum 43b, and exits the burner cap through an annular discharge opening 26. The size, shape and directional arrangement of the fuel and oxidizer discharge openings may be varied to suit various fuel and oxidizer combinations.

Cooling medium 85 is introduced to the inside of burner tube 10 via hole 51' and cooling medium delivery means 52b. The cooling medium enters plenum 53b and exits the burner cap through an annular discharge opening 27. As with the annular opening for the oxidizer, the annular opening for the cooling medium can be arranged in a fashion to produce an optimum gaseous shield, which varies depending on the specific fuel and oxidizer that feed the combustion reaction. The concave shape of combustion initiation end 29' of the burner cap shown in FIG. 4 is made up by the various shapes of the fuel, oxidizer, and cooling medium delivery means.

Figure 5:
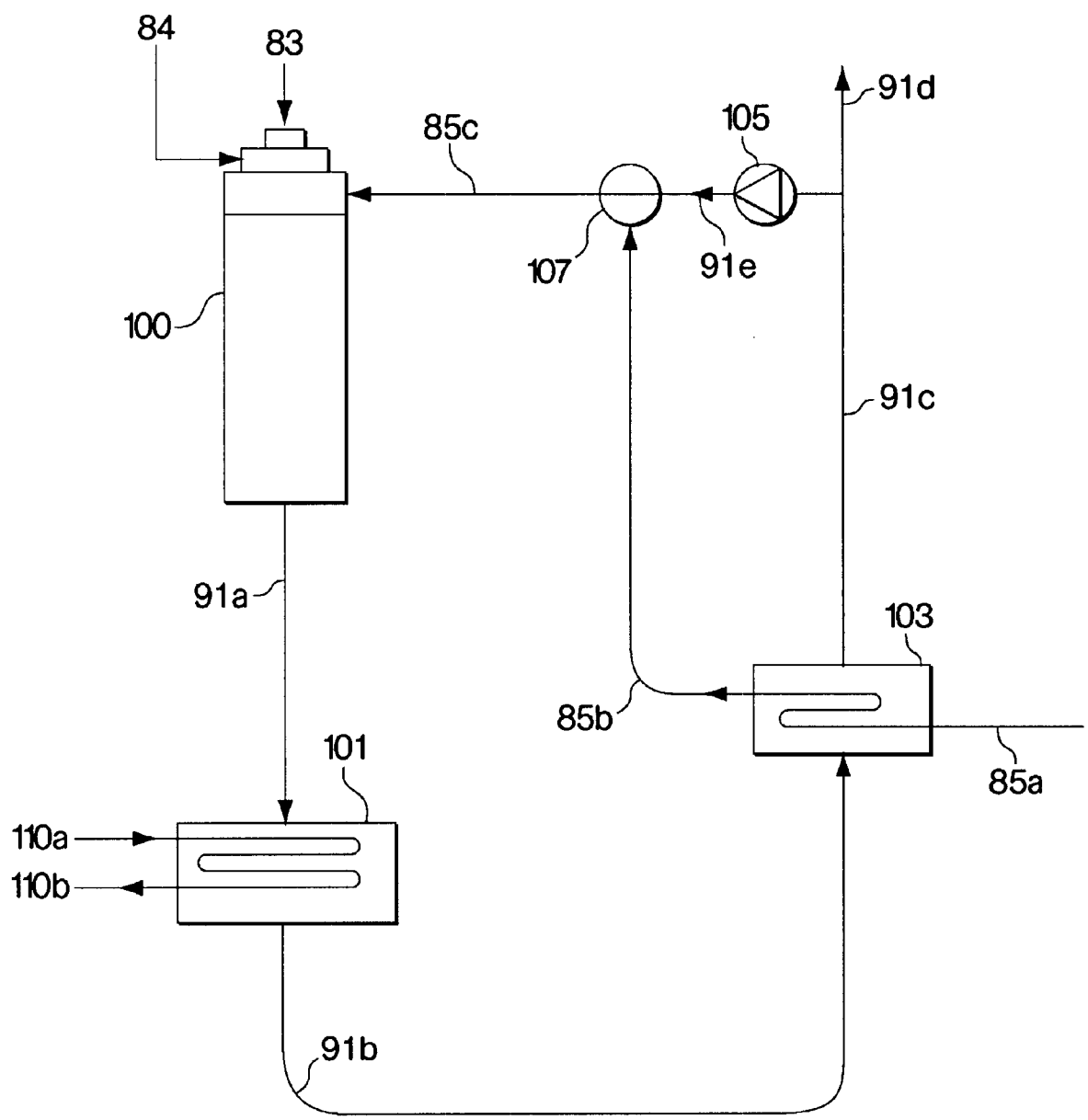
FIG. 5 is a block diagram of a method of burning fuel using a burner of the present invention.

FIG. 5 is a block diagram of a method of burning fuel using a burner of the present invention.

Fuel 83 and oxidizer 84 are fed to a burner 100. Gaseous cooling medium 85c is also provided. The fuel and oxidizer are involved in a combustion reaction, and the products of this reaction, combined with the heated cooling medium, exit the burner 100 as hot exhaust gasses 91a. The hot exhaust gasses pass through heat exchanger 101 which is used to increase the heat of any entering working fluid 110a. The heated working fluid 110b can be used for various purposes.

The cooled exhaust gasses 91b pass through heat exchanger 103 where heat is transferred to makeup cooling medium 85a. As discussed above, the cooling medium is preferably water, carbon dioxide, or a combination of the two. Heat exchanger 103 can be used to convert liquid water 85a into a gaseous form 85b that is desirable for keeping heat from reaching the burner walls. However, it is not necessary that heat exchanger 103 be used to convert liquid water to gaseous water. The preheating of carbon dioxide, or a mixture of water and carbon dioxide could also be practiced. Preheated cooling medium 85b exits heat exchanger 103, as do further cooled exhaust gasses 91c.

Some fraction 91e of the exhaust gasses can be drawn from stream 91c by a pump or compressor 105. The balance of the exhaust gasses 91d are discharged from the cycle. Mixing valve 107 is used to combine the fraction of exhaust gasses 91d and preheated cooling medium 85b to make the total inflow of cooling medium 85c used to capture the heat of combustion before it reaches the walls of the burner 100.

When the oxidizer used in the burner of the present invention becomes richer in oxygen, the combustion products tend to be a combination of water and carbon dioxide, so that mixing of cooled exhaust products with some amount of fresh cooling medium still results in a cooling medium that is primarily made up of water and carbon dioxide. A low-pollution result is achieved by the high temperature reaction.

Various control loops can be employed to modulate the various aspects of the above-described cycle, and to maintain optimum operation of the burner unit and the heat cycle.

The present invention, described above, relates to a burner for high-temperature combustion. Features of the present invention are recited in the appended claims. The drawings contained herein necessarily depict structural features and embodiments of the burner for high-temperature combustion, useful in the practice of the present invention.

However, it will be appreciated by those skilled in the arts pertaining thereto, that the present invention can be practiced in various alternate forms, proportions, and configurations. Further, the previous detailed descriptions of the preferred embodiments of the present invention are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What I claim is:

1. A method of burning materials comprising:
   (a) providing a burner having
      a hollow burner tube having a combustion end, an open discharge end, and an interior wall; a burner cap located at the combustion end of the hollow burner tube;
      a fuel delivery means in the burner cap, having an opening for the discharge of fuel to the interior of the hollow burner tube, where the opening for discharging fuel is located near the longitudinal axis of the hollow burner tube;
      an oxidizer delivery means in the burner cap, having an opening for the discharge of oxidizer to the interior of the hollow burner tube, where the opening for discharging the oxidizer is located between the longitudinal axis of the hollow burner tube and the interior wall of the hollow burner tube; and
      cooling medium delivery means in the burner cap, having an opening for the discharge of a cooling medium to the interior of the hollow burner tube, where the opening for discharging the cooling medium is located between the opening for discharging the oxidizer and the interior wall of the hollow burner tube;
   (b) providing a fuel to the fuel delivery means and an oxidizer to the oxidizer deliver means;
   (c) initiating a combustion reaction between the fuel and the oxidizer to produce hot exhaust products; and
   (d) providing a gaseous cooling medium to the cooling medium delivery means and inducing a flow of gaseous cooling medium between the combustion reaction and the interior wall of the hollow burner tube.

2. A method of burning materials as described in claim 1, where the gaseous cooling medium is primarily water.

3. A method of burning materials as described in claim 2, further comprising:
   (e) directing the hot exhaust products to a heat exchanger; and
   (f) transferring some of the heat of the hot exhaust products to the cooling medium.

4. A method of burning materials as described in claim 1, where the gaseous cooling medium is primarily a mixture of water and carbon dioxide.

5. A method of burning materials as described in claim 1, where the oxidizer is enriched air having at least 28 percent oxygen gas.

6. A method of burning materials as described in claim 5, where the gaseous cooling medium is primarily water.

7. A method of burning materials as described in claim 6, further comprising:
   (e) directing the hot exhaust products to a heat exchanger; and
   (f) transferring some of the heat of the hot exhaust products to the cooling medium.

8. A method of burning materials as described in claim 5, where the gaseous cooling medium is primarily a mixture of water and carbon dioxide.

9. A method of burning materials as described in claim 8, where the gaseous cooling medium is partially made of the hot exhaust products of the combustion reaction.

10. A method of burning materials as described in claim 9, further comprising:
   (e) directing the hot exhaust products to a heat exchanger; and
   (f) transferring some of the heat of the hot exhaust products to the cooling medium via the heat exchanger.

* * * * *